(12) United States Patent
Sugita et al.

(10) Patent No.: US 9,929,631 B2
(45) Date of Patent: Mar. 27, 2018

(54) INTERIOR MAGNET LINEAR INDUCTION MOTOR

(71) Applicant: SANYO DENKI CO., LTD., Tokyo (JP)

(72) Inventors: Satoshi Sugita, Tokyo (JP); Yuqi Tang, Tokyo (JP); Yasushi Misawa, Tokyo (JP); Shigenori Miyairi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 388 days.

(21) Appl. No.: 14/185,142

(22) Filed: Feb. 20, 2014

(65) Prior Publication Data

US 2014/0232209 A1    Aug. 21, 2014

(30) Foreign Application Priority Data

Feb. 20, 2013  (JP) .................................. 2013-031155

(51) Int. Cl.
*H02K 41/03*    (2006.01)

(52) U.S. Cl.
CPC .................. *H02K 41/033* (2013.01)

(58) Field of Classification Search
CPC .......... H02K 1/17; H02K 21/04; H02K 21/38; H02K 41/033
USPC .................................. 310/181, 12.02, 12.18
See application file for complete search history.

(56) References Cited

U.S. PATENT DOCUMENTS

| 5,010,262 | A | | 4/1991 | Nakagawa et al. |
| 5,218,250 | A | * | 6/1993 | Nakagawa ............ H02K 21/22 310/12.21 |
| 6,242,834 | B1 | * | 6/2001 | Akemakou ........... H02K 19/24 310/162 |
| 6,713,899 | B1 | * | 3/2004 | Greubel ............... H02K 41/031 310/12.18 |
| 6,960,858 | B2 | * | 11/2005 | Kawai .................... H02K 41/03 310/12.24 |

(Continued)

FOREIGN PATENT DOCUMENTS

| JP | 232750 | 2/1990 |
| JP | H02280655 A | 11/1990 |

(Continued)

OTHER PUBLICATIONS

Machine Translation, Shimada, JP 06054471 A, Feb. 25, 1994.*

(Continued)

*Primary Examiner* — Thomas Truong
(74) *Attorney, Agent, or Firm* — Polsinelli PC

(57) ABSTRACT

An interior magnet linear induction motor includes an armature and a line of inductor teeth. The armature includes coils arranged between a plurality of teeth, and the line of inductor teeth is arranged so as to face the armature and includes a plurality of tooth portions arranged at a constant pitch in a linear stroke direction. An end portion of each of the plurality of teeth has a shape such that magnetoresistance of the tooth increases toward the root side. At least one permanent magnet is arranged at an end portion of each of the plurality of teeth and adjacent permanent magnets that are arranged at different teeth are magnetized such that opposite magnetic poles face each other.

12 Claims, 18 Drawing Sheets

(56) References Cited

U.S. PATENT DOCUMENTS

| | | | |
|---|---|---|---|
| 7,800,256 B2* | 9/2010 | Jajtic | H02K 1/06 310/114 |
| 2005/0173991 A1* | 8/2005 | Watarai | H02K 41/03 310/12.25 |
| 2010/0072831 A1* | 3/2010 | Gadelmeier | H02K 41/033 310/12.24 |
| 2010/0259112 A1* | 10/2010 | Chung | H02K 16/00 310/12.18 |
| 2014/0091666 A1 | 4/2014 | Neumann | |
| 2014/0091673 A1 | 4/2014 | Anbarasu et al. | |

FOREIGN PATENT DOCUMENTS

| | | | |
|---|---|---|---|
| JP | 06054471 A | * | 2/1994 |
| JP | 2751684 B2 | | 5/1998 |
| JP | 2001028871 A | | 1/2001 |
| JP | 2006311687 A | | 11/2006 |
| JP | 2009153371 A | | 7/2009 |
| JP | 2009-195064 A | | 8/2009 |
| JP | 2011-125180 A | | 6/2011 |
| WO | WO-2012059109 A2 | | 5/2012 |

OTHER PUBLICATIONS

Extended European Search Report dated Mar. 31, 2016 for the corresponding European Patent Application No. 14155900.5.
Office Action dated Sep. 27, 2016 issued in Japanese Patent Application No. 2013-031155, pp. 1-5.

* cited by examiner

INTERIOR MAGNET LINEAR INDUCTION MOTOR

CROSS-REFERENCE TO RELATED APPLICATION

This application claims priority to Japanese Application No. 2013-031155, filed Feb. 20, 2013, the entirety of which is incorporated herein by reference.

BACKGROUND

1. Technical Field

The present invention relates to an interior magnet linear induction motor that causes a driving target to move linearly by electromagnetic force.

2. Description of Related Art

A permanent magnet linear motor is provided with a primary-side armature and a secondary-side electromagnetic rail. The primary-side armature includes coils arranged between teeth, and the secondary-side electromagnetic rail is provided so as to face the armature. In the secondary-side electromagnetic rail, a plurality of permanent magnets is arranged in a line such that opposite magnetic poles face each other.

The permanent magnet linear motor causes a current to flow in the coils of the armature such that a magnetic field caused by the current intersects the magnetic flux generated by the permanent magnets of the electromagnetic rail, and causes the armature or the electromagnetic rail to undergo relative linear motion by an electromagnetic action. For permanent magnet linear motors, a surface permanent magnet (SPM) configuration in which a line of permanent magnets is arranged on the electromagnetic-field-side surface is the mainstream. In order to realize both low cogging force and high durability, an internal permanent magnet (IPM) configuration is created.

As a technology related to an IPM linear motor, a linear motor has been disclosed that includes a plurality of window-shape insertion apertures near a surface of a stator core, on which a plurality of permanent magnets are arranged, and in which the plurality of permanent magnets are inserted into the insertion apertures and fixed in place, the window-shape insertion apertures each being formed by leaving a thin portion serving as an outer frame (see, for example, Japanese Patent No. 2751684).

In addition, an interior magnet linear induction motor is provided with a primary-side armature and a secondary-side line of inductor teeth. The primary-side armature includes coils arranged between teeth, and the secondary-side line of inductor teeth is provided so as to face the armature and includes a plurality of tooth portions arranged at a constant pitch. Permanent magnets may be arranged in the line of inductor teeth or in the teeth side of the armature.

The interior magnet linear induction motor causes magnetic flux to be generated sequentially in the gaps between magnetic poles of the armature and the tooth portions of the line of inductor teeth, and causes the armature or the electromagnetic rail to undergo relative linear motion.

As a technology related to an interior magnet linear induction motor, a pulse motor has been disclosed in which a primary-side magnetic flux generation unit (an armature) includes a group of separate cores, permanent magnets, and a coil (see, for example, Unexamined Japanese Patent Publication No. 2-32750). The group of separate cores may be obtained by dividing a core into a plurality of cores in a certain direction so as to correspond to the gaps between the tooth portions, and both ends of the group of separate cores have magnetic poles that face tooth portions. Each of the permanent magnets is inserted between corresponding separate cores such that the magnetic poles of any adjacent two of the permanent magnets are opposite to each other. The coil is formed around the group of separate cores.

Here, a permanent magnet linear motor such as that disclosed in Japanese Patent No. 2751684 has superior thrust characteristics. However, in such a permanent magnet linear motor, since permanent magnets are arranged over the entire stroke, the number of magnets used is large and the manufacturing cost is high.

Furthermore, in such a permanent magnet linear motor, since the density of magnetic flux leakage due to the permanent magnets on the electromagnetic-field-side surface is high, maintenance is performed while taking various safety precautions.

An interior magnet linear induction motor demagnetizes to a lesser degree and has superior thrust characteristics than a PM motor, and uses a smaller number of permanent magnets than a permanent magnet motor. However, the thrust of an interior magnet linear induction motor per unit size is smaller than that of a permanent magnet motor and thus the range of application of an induction type motor to applications is limited.

SUMMARY

The present invention has been made in order to solve such a problem. An object of the present invention is to provide an interior magnet linear induction motor that may improve thrust characteristics, widen the range of application of an induction type motor to applications, reduce the number of magnets used, reduce the manufacturing cost, and be easily maintained.

In order to achieve the above-described object, an interior magnet linear induction motor includes an armature that includes coils arranged between a plurality of teeth, and a line of inductor teeth that is arranged so as to face the armature and includes a plurality of tooth portions arranged at a constant pitch.

An end portion of each of the plurality of teeth has a shape such that magnetoresistance of the tooth increases toward a root side.

At least one permanent magnet is arranged at an end portion of each of the plurality of teeth. Adjacent permanent magnets that are arranged at different teeth are magnetized such that opposite magnetic poles face each other.

According to an interior magnet linear induction motor according to an aspect of the present invention, by devising the shape of the plurality of teeth and the arrangement of the permanent magnets, the short circuit magnetic flux between the permanent magnets may be used to increase a thrust and the thrust per unit facing area may be increased, the short circuit magnetic flux having not been used before. The range of application of an induction type motor to applications may be widened by improving thrust characteristics of a linear induction motor.

In addition, the interior magnet linear induction motor according to the aspect of the present invention uses a smaller number of magnets than existing permanent magnet linear motors and may reduce the manufacturing cost.

Furthermore, by replacing an existing permanent magnet linear motor with an induction type linear motor, the magnetic flux leakage due to an electromagnetic rail (a line of inductor teeth) may be significantly reduced and maintenance may be easily and safely performed.

DETAILED DESCRIPTION

In the following, with reference to the drawings, interior magnet linear induction motors according to first to sixth embodiments will be described.

The interior magnet linear induction motors according to the first to sixth embodiments use short circuit magnetic flux of permanent magnets to increase a thrust by devising the shape of teeth and the arrangement of the permanent magnets. In addition, the interior magnet linear induction motors use a small number of magnets and the magnetic flux leakage due to a line of inductor teeth is significantly reduced.

Thus, according to the first to sixth embodiments, an interior magnet linear induction motor may be realized that may improve thrust characteristics, widen the range of application of an induction type motor to applications, reduce the manufacturing cost, and be easily maintained.

First Embodiment

[Configuration of Interior Magnet Linear Induction Motor]

Figure 1:
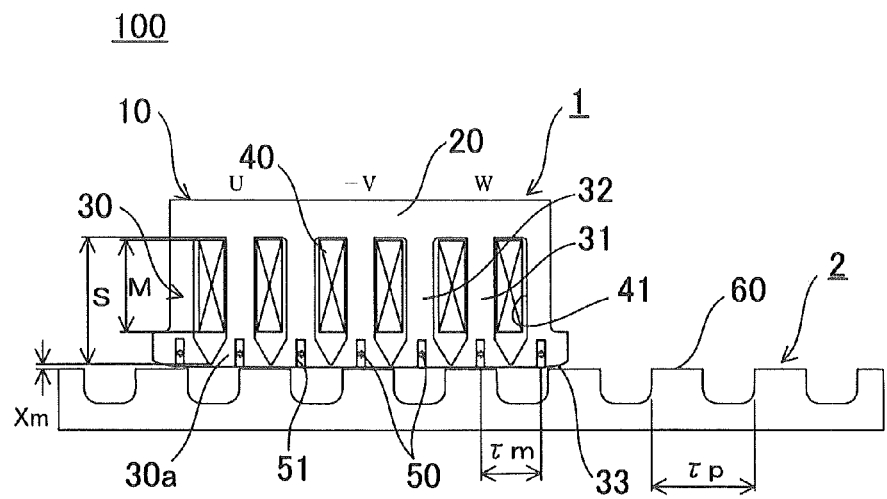
FIG. 1 is a schematic plan view of an interior magnet linear induction motor of a first embodiment.

First, with reference to FIGS. 1 to 10, the configuration of an interior magnet linear induction motor of the first embodiment will be described. FIG. 1 is a schematic plan view of an interior magnet linear induction motor of the first embodiment.

FIG. 1 illustrates a basic embodiment of the first embodiment, and FIGS. 2 to 10 illustrate modified examples of the basic embodiment. The first embodiment will be described on the basis of the basic embodiment of FIG. 1 and, as necessary, the modified examples will be described with reference to FIGS. 2 to 10.

As illustrated in FIG. 1, an interior magnet linear induction motor 100 of the first embodiment includes an armature 1 and a line of inductor teeth 2 that faces the armature 1.

The armature 1 includes an armature core 10, coils 40, and permanent magnets 50. The armature core 10 includes a yoke 20 and a plurality of teeth 30. The armature core 10 may be a unit block; however, the armature core 10 is preferably formed of, for example, a core stack in which core sheets are stacked.

The yoke 20 has a function for closing magnetic lines of force of the armature 1 and maximizing an electromagnetic induction action. In addition, the yoke 20 also has a function for preventing peripheral devices of the interior magnet linear induction motor 100 from being affected by a magnetic field caused by electromagnetic induction. In the line-of-inductor-teeth side of the yoke 20, the plurality of teeth 30 are provided.

The plurality of teeth 30 are members for partition to form slots 41, which are spaces for housing the coils 40. The plurality of teeth 30 are arranged in a stroke direction of the armature 1 (a direction from left to right or a direction from right to left in FIG. 1).

In the basic embodiment of FIG. 1, the yoke 20 and the plurality of teeth 30 are integrally formed as the armature core 10. The configuration of the armature core 10 is not limited to this, and the armature core 10 may have a divided-type configuration.

Figure 2:
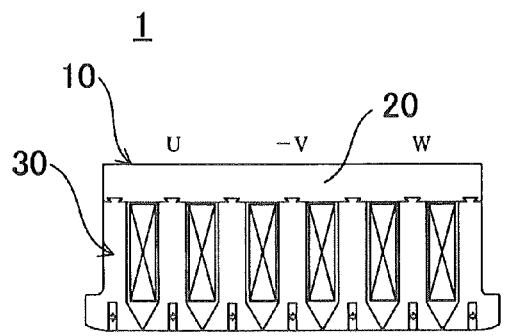
FIG. 2 is a schematic plan view of a modified example in which a yoke and teeth are formed as portions included in a divided-type configuration, in the first embodiment.

FIG. 2 is a schematic plan view of a modified example in which the yoke 20 and the plurality of teeth 30 are formed as portions included in a divided-type configuration.

In the armature core 10 of FIG. 2, the yoke 20 and the plurality of teeth 30 are formed as portions included in a divided-type configuration. The yoke 20 and the plurality of teeth 30 formed as separate cores are engaged with each other. The engagement configuration of the yoke 20 and the plurality of teeth 30 illustrated in FIG. 2 is an example, and an engagement configuration of the yoke 20 and the plurality of teeth 30 is not limited to the illustrated engagement configuration.

The armature core 10 is composed of, for example, an iron-based magnetic material such as silicon steel or a SC material; however, a material of the armature core 10 is not limited to the described materials. In the case where the armature core 10 is composed of a plurality of separate cores, materials used may be partially different.

As illustrated in FIG. 1, an end portion 30a of each of the plurality of teeth 30 has a shape such that magnetoresistance of the tooth increases toward the root side. Specifically, the end portion 30a of each of the plurality of teeth 30 has a shape whose width increases toward the line of inductor teeth 2. Due to the end portion 30a of each of the plurality of teeth 30 having a shape such that magnetoresistance of the tooth increases toward the rood side and a magnetization arrangement of the permanent magnets 50, which will be described later, the short circuit magnetic flux between the permanent magnets 50 may be used to increase a thrust.

Tip portions of the slots 41 of the first embodiment are closed and have a V shape in vertical cross section in a linear stroke direction.

A coil 40 is formed around every other tooth 30 and housed in a corresponding slot 41. In the first embodiment, for example, the coils 40 connected to U, −V, and W of an alternating current three-phase power supply are sequentially arranged in the stroke direction.

A winding length M of the coils 40 is set to be shorter than a vertical-direction length S of the slots 41. Thus, a space is formed in the tip portions of the slots 41. A space does not have to be present in the tip portions of the slots 41.

Figure 3:
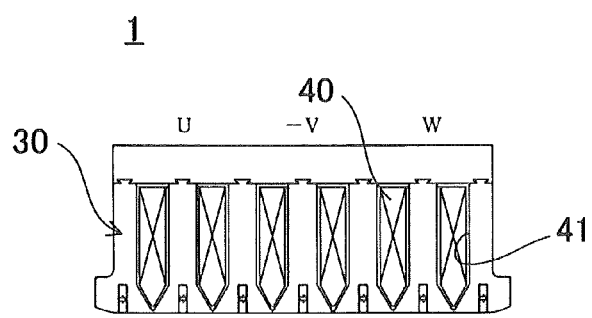
FIG. 3 is a schematic plan view of a modified example in which the yoke and teeth are formed as portions included in the divided-type configuration in FIG. 2 and coils are arranged to be close to end portions of the teeth.

FIG. 3 is a schematic plan view of a modified example in which the coils 40 are arranged to be close to the end portions of the plurality of teeth 30 in FIG. 2.

In the modified example of FIG. 3, the coils 40 are arranged to reach the tip portions of the slots 41, that is, are arranged to be close to the end portions of the teeth 30. By arranging the coils 40 to be close to the end portions of the teeth 30, the coils 40 are positioned closer to the permanent magnets 50 and the short circuit magnetic flux between the permanent magnets 50 is more easily utilized.

The plurality of teeth 30 of the first embodiment, as illustrated in FIG. 1, are constituted by winding-use teeth 31 and partition-use teeth 32. The winding-use teeth 31 are teeth around which the coils 40 are to be formed and the partition-use teeth 32 are teeth around which the coils 40 are not to be formed. The partition-use teeth 32 are used for partition to form the slots 41. The winding-use teeth 31 and the partition-use teeth 32 are alternately arranged. That is, each coil 40 is formed around a corresponding winding-use tooth 31 sandwiched between two slots 41.

Figure 4A:
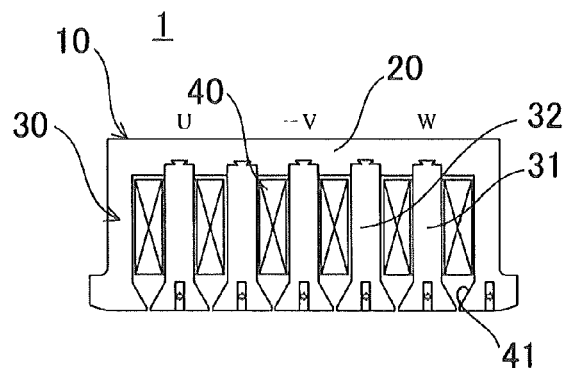
FIG. 4A is a schematic plan view of a modified example in which, in the first embodiment, winding-use teeth are formed as portions included in a divided-type configuration.
Figure 4B:
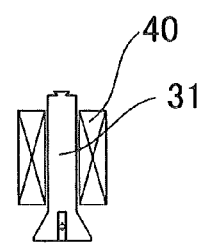
FIG. 4B is a schematic side view of such a winding-use tooth.

FIG. 4A is a schematic plan view of a modified example in which the winding-use teeth 31 are formed as portions included in a divided-type configuration, and FIG. 4B is a schematic side view of such a winding-use tooth 31.

As illustrated in FIG. 4A, in the armature core 10, the winding-use teeth 31, around which the coils 40 are to be formed, may be formed as separate cores. In this case, the yoke 20 and the partition-use teeth 32 are integrally formed and the winding-use teeth 31 are formed separately. By forming the winding-use teeth 31 as separate cores, the coils 40 may be formed around the winding-use teeth 31 in advance. In addition, since the winding-use teeth 31 are formed as separate cores, the tip portion of each of the slots 41 is open.

Figure 5A:
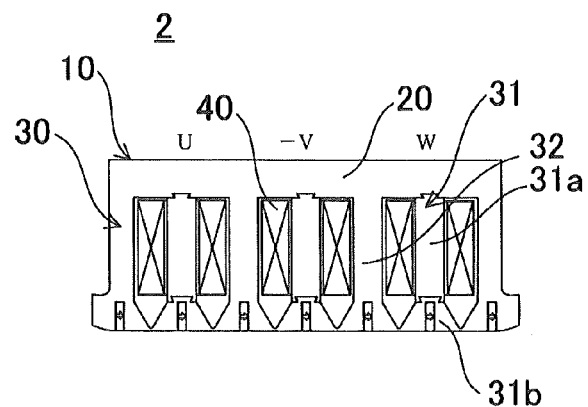
FIG. 5A is a schematic plan view of a modified example in which, in the first embodiment, winding-use portions of winding-use teeth are formed as portions included in a divided-type configuration.
Figure 5B:
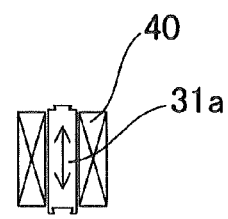
FIG. 5B is a schematic side view of such a winding-use tooth.

In addition, FIG. 5A is a schematic plan view of a modified example in which winding-use portions of the winding-use teeth 31 are formed as portions included in a divided-type configuration, and FIG. 5B is a schematic side view of such a winding-use tooth 31.

As illustrated in FIG. 5, winding-use portions 31a of the winding-use teeth 31, around which the coils 40 are to be formed, may be formed as separate cores. In this case, the yoke 20, the partition-use teeth 32, and end portions 31b of the winding-use teeth 31 are integrally formed, and the winding-use portions 31a having a bar shape are separately formed.

In the case where the winding-use portions 31a are formed as separate cores, as a component material of the winding-use portions 31a, a directional electrical steel sheet may be used so as to match a direction of the flow of magnetic flux. By forming the winding-use portions 31a out of a directional electrical steel sheet, the magnetoresistance of the winding-use portions 31a may be reduced, a thrust and a coil area are increased, and a higher efficiency may be realized. In addition, by forming the winding-use portions 31a as separate cores, the coils 40 may be formed around the winding-use portions 31a in advance.

In the basic embodiment of FIG. 1, the winding-use teeth 31 and the partition-use teeth 32 are formed to have the same width. The widths of the winding-use teeth 31 and the partition-use teeth 32 are not limited to this. The winding-use teeth 31 and the partition-use teeth 32 may be formed such that the width of the winding-use teeth 31 differs from that of the partition-use teeth 32.

Figure 6:
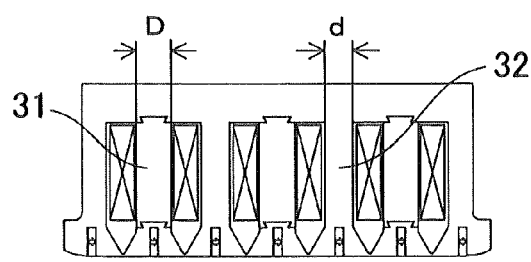
FIG. 6 is a schematic plan view of a modified example in which, in the first embodiment, the width of winding-use teeth is set to be wider.

FIG. 6 is a schematic plan view of a modified example in which the width of the winding-use teeth 31 is set to be wider.

In the modified example of FIG. 6, a width D of the winding-use teeth 31 is set to be wider than a width d of the partition-use teeth 32. By setting the width D of the winding-use teeth 31 to be wider than the width d of the partition-use teeth 32, the magnetoresistance of the winding-use teeth 31 may be reduced and a thrust may be increased.

In addition, in the basic embodiment of FIG. 1, the width of the winding-use teeth 31 and that of the partition-use teeth 32 in a direction perpendicular to the linear stroke direction are set to be the same width. The width of the winding-use teeth 31 and that of the partition-use teeth 32 in the direction perpendicular to the linear stroke direction are not limited to this. The width of the winding-use teeth 31 may differ from that of the partition-use teeth 32 in the direction perpendicular to the linear stroke direction.

Figure 7:
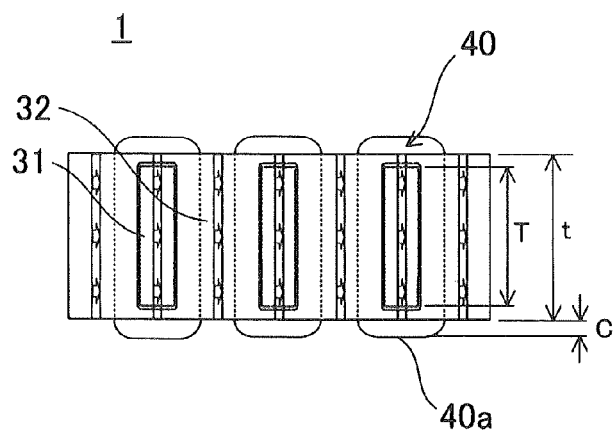
FIG. 7 is a schematic diagram of a modified example in which, in the first embodiment, the width of the winding-use teeth in a direction perpendicular to a linear stroke direction is set to be narrower.

FIG. 7 is a schematic diagram of a modified example in which the width of the winding-use teeth 31 in the direction perpendicular to the linear stroke direction is set to be narrower.

In the modified example of FIG. 7, the width of the winding-use teeth 31 in a direction perpendicular to a stroke direction is set to be narrower than that of the partition-use teeth 32 in the direction perpendicular to the stroke direction. In the first embodiment, since the armature core 10 is formed of a core stack, a stacking thickness T of the winding-use teeth 31 is set to be smaller than a stacking thickness t of the partition-use teeth 32. By setting the stacking thickness T of the winding-use teeth 31 to be smaller than the stacking thickness t of the partition-use teeth 32, a degree of protrusion C of coil ends 40a may be suppressed without increasing the magnetoresistance of the winding-use teeth 31 and space saving and thrust increase may be realized.

In addition, in the basic embodiment of FIG. 1, the coils 40 are formed around the winding-use teeth 31, the winding-use teeth 31 and the partition-use teeth 32 being alternately arranged; however, the configuration is not limited to this.

Figure 8:
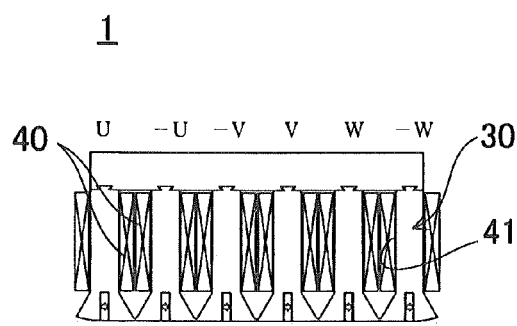
FIG. 8 is a schematic plan view of a modified example in which, in the first embodiment, a coil is formed around each tooth.

FIG. 8 is a schematic plan view of a modified example in which each of the coils 40 is formed around a corresponding one of the plurality of teeth 30.

As illustrated in FIG. 8, each of the coils 40 may be formed around a corresponding one of the plurality of teeth 30. In this case, each of the slots 41 houses two of the coils 40.

As illustrated in FIG. 1, a taper portion 33 is formed at both ends of the plurality of teeth 30 in the stroke direction to reduce cogging at the time of linear motion.

At the end portion 30a of each tooth 30, a magnet housing portion 51 having a rectangular-shape groove is formed, the magnet housing portion 51 being open to the line of inductor teeth 2. In the first embodiment, one magnet housing portion 51 is formed at the end portion 30a of each tooth 30. Magnet housing portions 51 are arranged at a constant pitch over the plurality of teeth 30 in the linear stroke direction. In each magnet housing portion 51, a permanent magnet 50 is housed.

In FIG. 1, arrows of the permanent magnets 50 represent the magnetization directions of the permanent magnets 50. All the permanent magnets 50 in the first embodiment are magnetized such that the magnetization directions are the same. Any adjacent two permanent magnets 50 one of which belongs to a winding-use tooth 31 and the other one of which belongs to a partition-use tooth 32 are magnetized such that opposite magnetic poles face each other.

In the basic embodiment of FIG. 1, each permanent magnet 50 is arranged to be closer to the line-of-inductor-teeth side than to a level where the coils 40 are arranged. The configuration is not limited to this, and the permanent magnets 50 may extend toward the inside of the core of the armature 1.

Figure 9:
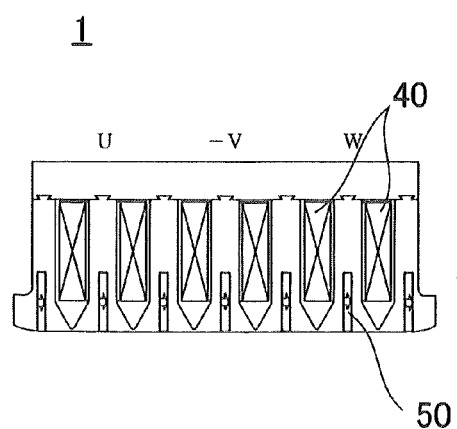
FIG. 9 is a schematic plan view of a modified example in which, in the first embodiment, the length of permanent magnets is elongated.

FIG. 9 is a schematic plan view of a modified example in which the length of permanent magnets is elongated.

As illustrated in FIG. 9, the permanent magnets 50 extend toward the inside of the core from the end portions of the plurality of teeth 30. The length of each permanent magnet 50 is elongated such that an end of the permanent magnet 50 reaches a point between corresponding adjacent coils 40.

As the permanent magnets 50, for example, a rare earth magnet such as a neodymium magnet may be used; however, the material of the permanent magnets 50 is not limited to the described material.

The line of inductor teeth 2 is provided, as illustrated in FIG. 1, such that the line of inductor teeth 2 faces the ends of the plurality of teeth 30 of the armature 1 with a constant gap between the line of inductor teeth 2 and the ends of the plurality of teeth 30. That is, the ends of teeth of the line of inductor teeth 2 and the ends of the plurality of teeth 30 are spaced with a mechanical gap Xm therebetween. Here, the mechanical gap Xm refers to a mechanical distance between the ends of the teeth of the line of inductor teeth 2 and the ends of the plurality of teeth 30.

The line of inductor teeth 2 has a plurality of tooth portions 60 arranged at a constant pitch in the linear stroke direction. The line of inductor teeth 2 is, for example, formed of a soft magnetic material.

In an application installment surface of the armature core 10 and/or that of the line of inductor teeth 2, a fastening member for use in application installment may be embedded.

Figure 10:
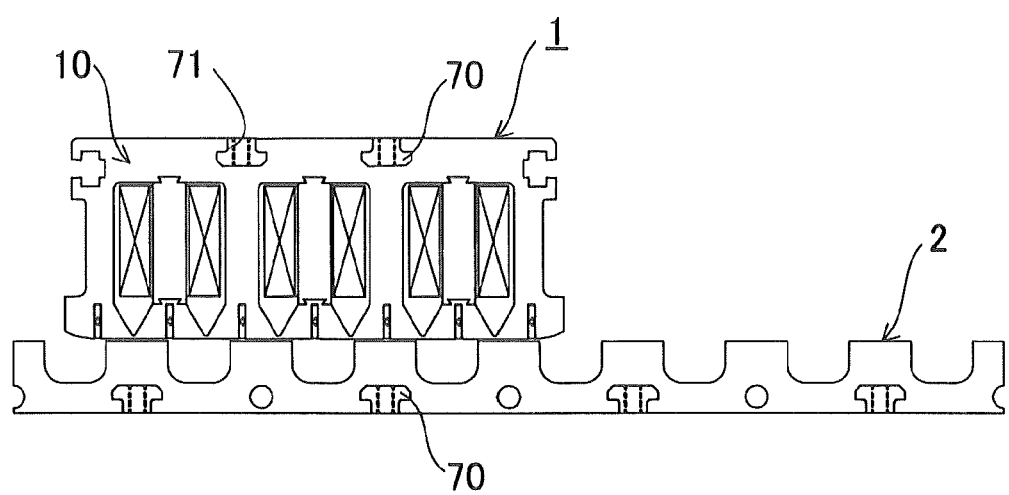
FIG. 10 is a schematic plan view of a modified example in which, in the first embodiment, substantially T-shaped nuts are arranged in an armature core and in a line of inductor teeth.

FIG. 10 is a schematic plan view of a modified example in which substantially T-shaped nuts are arranged in the armature core 10 and in the line of inductor teeth 2.

In the modified example of FIG. 10, groove portions 71 that are substantially T-shaped in vertical cross section are formed in the application installment surface of the armature core 10 and that of the line of inductor teeth 2, and nuts 70 that are substantially T-shaped in vertical cross section are arranged in the groove portions 71. By arranging the nuts 70 on the application installment surface, an inductor type application may be bolted and manufacturability and installability may be improved.

[Operation of Interior Magnet Linear Induction Motor]

Next, with reference to FIG. 1 and FIGS. 11A to 13, operation of the interior magnet linear induction motor 100 of the first embodiment will be described. Note that operational effects of the modified examples of FIGS. 2 to 10 have been described with each configuration, and thus description thereof will be omitted.

In the interior magnet linear induction motor 100 of the first embodiment illustrated in FIG. 1, the armature 1 and the line of inductor teeth 2 linearly move relative to each other. For example, the armature 1 functions as a needle and the line of inductor teeth 2 functions as a stator.

The armature 1 houses the coils 40 in the slots 41 formed by the plurality of teeth 30. The permanent magnets 50 are arranged at the end portions 30a of the plurality of teeth 30. The permanent magnets 50 are arranged at a constant pitch in the linear stroke direction over the plurality of teeth 30. All the permanent magnets 50 in the first embodiment are magnetized such that the magnetization directions are the same.

The line of inductor teeth 2 has the plurality of tooth portions 60 arranged at a constant pitch in the linear stroke direction. Since the line of inductor teeth 2 is formed of a soft magnetic material, the magnetic flux of the permanent magnets 50 of the armature 1 affects the line of inductor teeth 2 that faces the permanent magnets 50 and prevents the plurality of teeth 30 and the tooth portions 60 of the line of inductor teeth 2 from being attached to each other.

That is, the interior magnet linear induction motor 100 of the first embodiment generates magnetic flux sequentially in spaces formed by the magnetic poles of the armature 1 and the tooth portions 60 of the line of inductor teeth 2, and causes the armature 1 or the line of inductor teeth 2 serving as an electromagnetic rail to undergo relative linear motion.

In addition, the end portion 30a of each of the plurality of teeth 30 has a shape such that magnetoresistance of the tooth increases toward the root side, that is, a shape whose width increases toward the line of inductor teeth 2.

The tip portions of the slots 41 are V-shaped in vertical cross section. Any adjacent two permanent magnets 50 one of which belongs to a winding-use tooth 31 and the other one of which belongs to a partition-use tooth 32 are magnetized such that opposite magnetic poles face each other, the winding-use tooth 31 and partition-use tooth 32 being separated by a slot 41.

The end portion 30a of each of the plurality of teeth 30 has a shape such that magnetoresistance of the tooth increases toward the root side, and any adjacent two permanent magnets 50 one of which is arranged at a winding-use tooth 31 and the other one of which is arranged at a partition-use tooth 32 are magnetized such that opposite magnetic poles face each other. As a result, the short circuit magnetic flux between the permanent magnets 50 arranged between the teeth 30 may be used to increase a thrust.

FIGS. 11A to 12F are explanatory diagrams of simulation of coil excitation states. Note that, in FIGS. 11A to 12F, the reference numerals of constituent elements are omitted for better visibility of the coil excitation states.

Figure 11A:
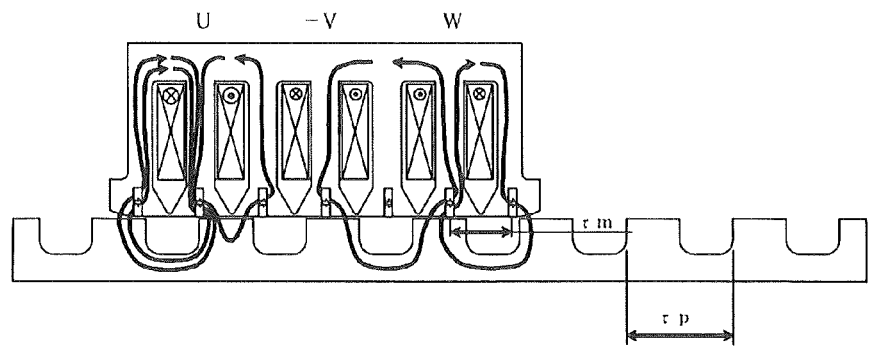
FIGS. 11A to 11C are explanatory diagrams of coil excitation states in the first embodiment.
Figure 11B:
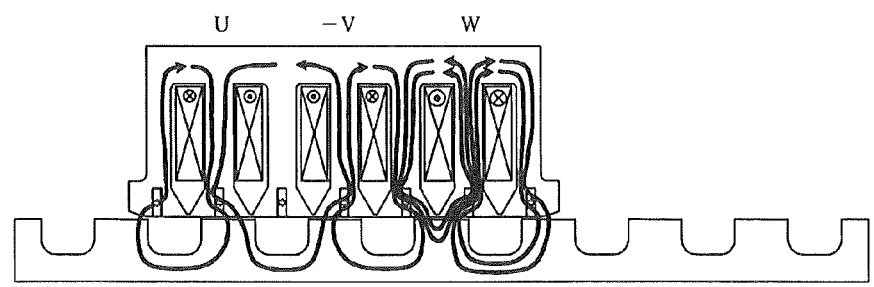
Figure 11C:
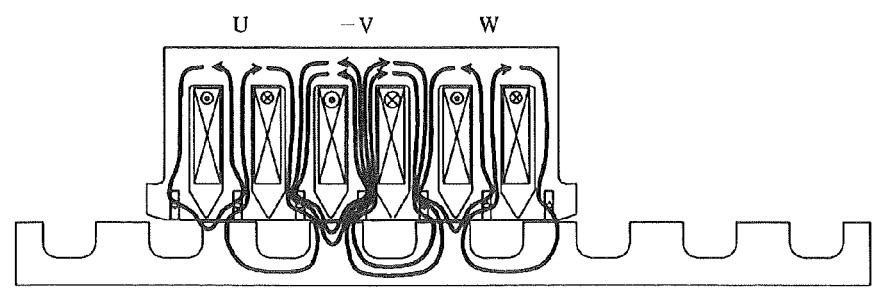
Figure 12D:
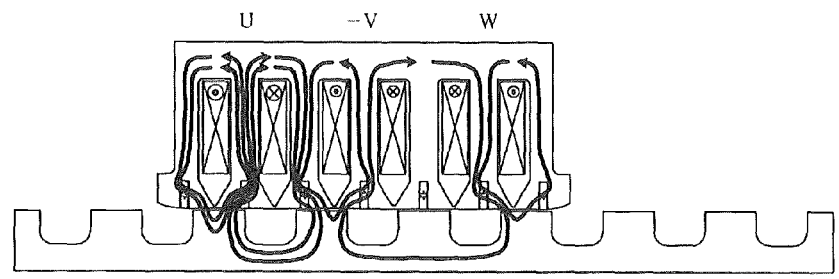
FIGS. 12D to 12F are explanatory diagrams of coil excitation states in the first embodiment.
Figure 12E:
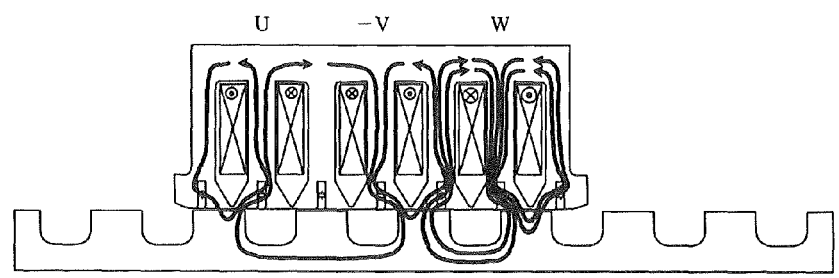
Figure 12F:
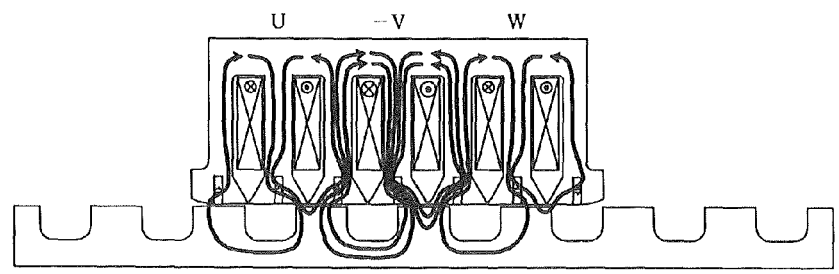

As illustrated in FIGS. 11A to 12F, coil excitation illustrated in FIGS. 11A to 12F represents almost one cycle of U phase, V phase, and W phase of an alternating current three-phase power supply. A current value in coil excitation illustrated in FIG. 11A is inversed in coil excitation illustrated in FIG. 12D.

The end portion 30a of each of the plurality of teeth 30 has a shape such that magnetoresistance of the tooth increases toward the root side. Thus, the magnetic flux of the coils 40 may flow in and out of the tooth-portion-60 side of the line of inductor teeth 2 (see FIG. 1). Furthermore, since opposite magnetic poles face each other for any adjacent two permanent magnets 50 one of which is arranged at a winding-use tooth 31 and the other one of which is arranged at a partition-use tooth 32, the short circuit magnetic flux between the permanent magnets 50 arranged between the plurality of teeth 30 may be used to increase a thrust (see FIG. 1).

Figure 13:
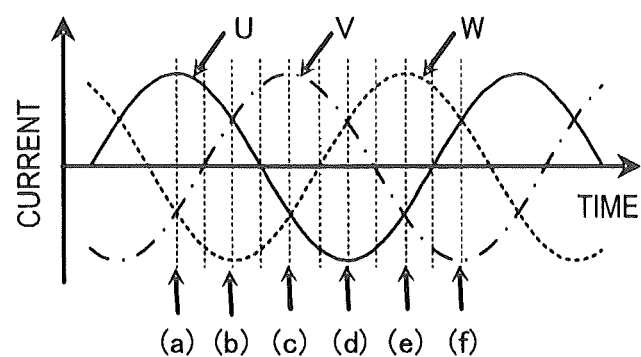
FIG. 13 is a current-time figure of coil excitation illustrated in FIGS. 11A to 12F.

FIG. 13 is a current-time figure of coil excitation illustrated in FIGS. 11A to 12F, the current-time figure being obtained by performing plotting. In FIG. 13, U phase is drawn with a solid line, V phase with an alternate-long-and-short-dash line, and W phase with a broken line.

As illustrated in FIG. 13, U phase, V phase, and W phase represent certain time-base phase shifts.

Here, in the case where m denotes the number of phases (m is an integer greater than or equal to 2), n denotes the number of permanent magnets at the end portions of teeth (n is an integer greater than or equal to 1), TS is a pitch at which the teeth are arranged, $\tau m$ is a pitch at which the magnet housing portions are arranged, and $\tau p$ is a pitch at which the tooth portions are arranged, the following Equation (1) is satisfied.

$\tau m = \tau s/n$, where $$1.5 < (\tau p/\tau m) < 2 \text{ or } 2 < (\tau p/\tau m) < 2.5 \quad (1)$$

In the first embodiment, m=3, n=1, and $\tau m = \tau s$, thereby $(\tau p/\tau m) = 12/7 \approx 1.71$. Thus, the first embodiment satisfies a range of numerical values of Equation (1).

The cogging force of the interior magnet linear induction motor 100 of the first embodiment occurs depending on positional relationships between the permanent magnets 50 and the tooth portions 60 of the line of inductor teeth 2. However, the positions of the permanent magnets 50 are slightly shifted in phase from one another when seen from the tooth portions 60, which are inductor teeth. The cogging forces balance each other out and the cogging force of the entirety of the linear motor becomes small. Thus, according to the first embodiment, the interior magnet linear induction motor 100 may be provided that has small cogging force and a small change in thrust.

That is, according to the interior magnet linear induction motor 100 of the first embodiment, by devising the shape of the plurality of teeth 30 and the arrangement of the permanent magnets 50, the short circuit magnetic flux between the permanent magnets 50 may be used to increase a thrust and the thrust per unit facing area may be increased, the short circuit magnetic flux having not been used before. By improving thrust characteristics of a linear induction motor, the range of application of an induction type motor to applications may be widened.

In addition, the interior magnet linear induction motor 100 of the first embodiment uses a smaller number of magnets than existing permanent magnet linear motors, and the manufacturing cost may be reduced.

Furthermore, in the interior magnet linear induction motor 100 of the first embodiment, the magnetic flux leakage due to the line of inductor teeth 2 serving as an electromagnetic rail may be significantly reduced by replacing an existing permanent magnet linear motor with an induction type linear motor, and maintenance may be easily and safely performed.

Second Embodiment

Figure 14:
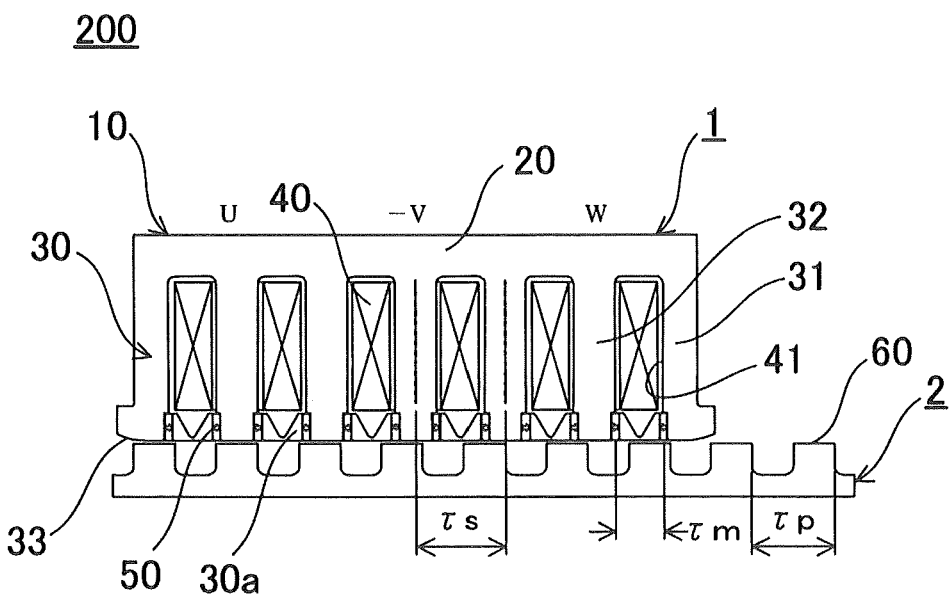
FIG. 14 is a schematic plan view of an interior magnet linear induction motor of a second embodiment.
Figure 15:
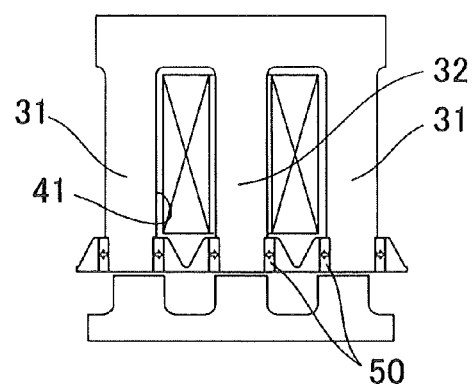
FIG. 15 is a schematic plan view of a main part of FIG. 14.

Next, with reference to FIGS. 14 to 19, an interior magnet linear induction motor 200 of a second embodiment will be described. FIG. 14 is a schematic plan view of the interior magnet linear induction motor 200 of the second embodiment. FIG. 15 is a schematic plan view of a main part of FIG. 14. Note that elements that are the same as those of the interior magnet linear induction motor 100 of the first embodiment are denoted by the same reference numerals and description thereof will be omitted.

As illustrated in FIG. 14, the interior magnet linear induction motor 200 of the second embodiment differs from the interior magnet linear induction motor 100 of the first embodiment in terms of the number of the permanent magnets 50 and magnetization arrangement.

As illustrated in FIGS. 14 and 15, in the second embodiment, except for the teeth 30 at both ends, two permanent magnets 50 are arranged at each of the end portions 30a of the teeth 30. The permanent magnets 50 are arranged at a constant pitch over the plurality of teeth 30, in the linear stroke direction.

Any adjacent two permanent magnets 50 one of which is arranged at a winding-use tooth 31 and the other one of which is arranged at a partition-use tooth 32 are magnetized such that opposite magnetic poles face each other. Adjacent permanent magnets 50 that are arranged at the same winding-use tooth 31 or partition-use tooth 32 are magnetized such that the same magnetic poles face each other. That is, opposite magnetic poles face each other for adjacent permanent magnets 50 with no slot 41 therebetween, and the same magnetic poles face each other for adjacent permanent magnets 50 with a slot 41 therebetween.

Figures 16A, 16B:
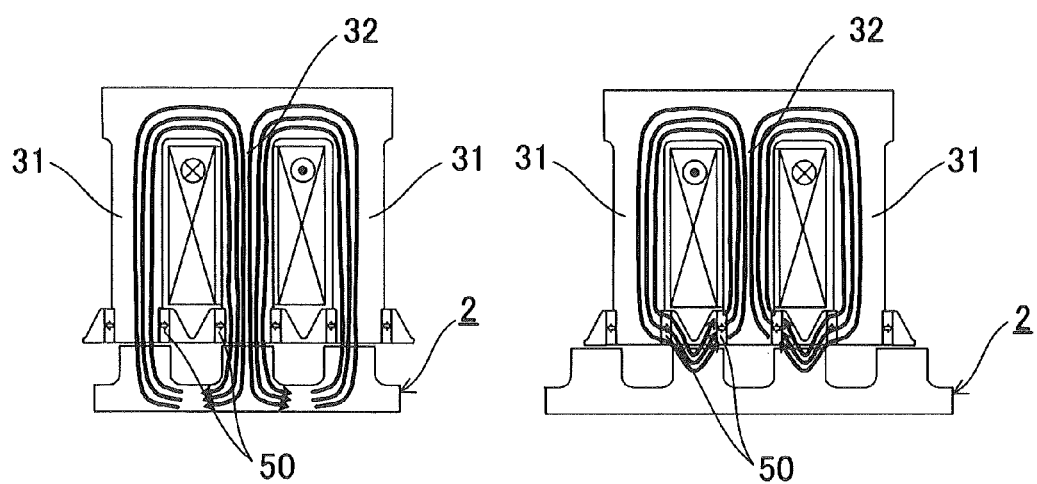
FIGS. 16A and 16B are explanatory diagrams of coil excitation states in a reverse direction or in a forward direction for adjacent permanent magnets in the second embodiment.

FIGS. 16A and 16B are explanatory diagrams of coil excitation states in a forward direction or in a reverse direction for adjacent permanent magnets.

FIG. 16A illustrates a case of coil excitation in the reverse direction for adjacent permanent magnets 50 one of which is arranged at a winding-use tooth 31 and the other one of which is arranged at a partition-use tooth 32. Two permanent magnets 50 that are magnetized in the same direction are connected in series to the winding-use tooth 31 and the partition-use tooth 32. Thus, even when a magnetic field is applied in the reverse direction by coil excitation, demagnetization is less likely to occur and the maximum thrust may be increased.

In contrast, FIG. 16B illustrates a case of coil excitation in the forward direction for adjacent permanent magnets 50 one of which is arranged at a winding-use tooth 31 and the other one of which is arranged at a partition-use tooth 32. Two permanent magnets 50 that are magnetized in the same direction are connected in series to the winding-use tooth 31 and the partition-use tooth 32. Thus, even when a magnetic field is applied in the forward direction by coil excitation, demagnetization is less likely to occur and the maximum thrust may be increased.

Next, with reference to FIGS. 17A to 19, the coil excitation states of the interior magnet linear induction motor 200 of the second embodiment will be described.

FIGS. 17A to 18F are explanatory diagrams of simulation of coil excitation states. Note that, in FIG. 17A to 18F, the reference numerals of constituent elements are omitted for better visibility of the coil excitation states.

Figure 17A:
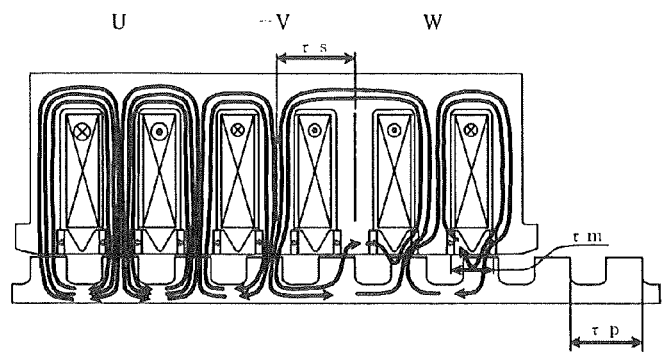
FIGS. 17A to 17C are explanatory diagrams of coil excitation states in the second embodiment.
Figure 17B:
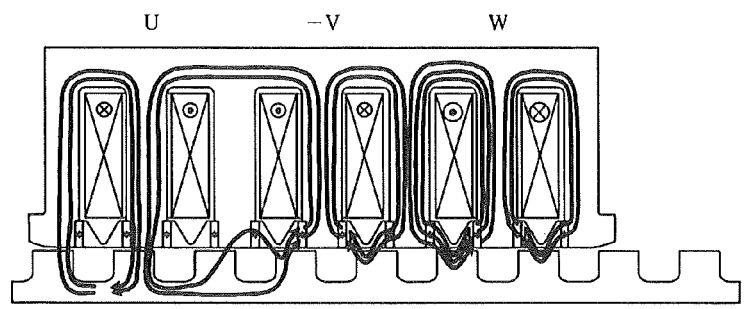
Figure 17C:
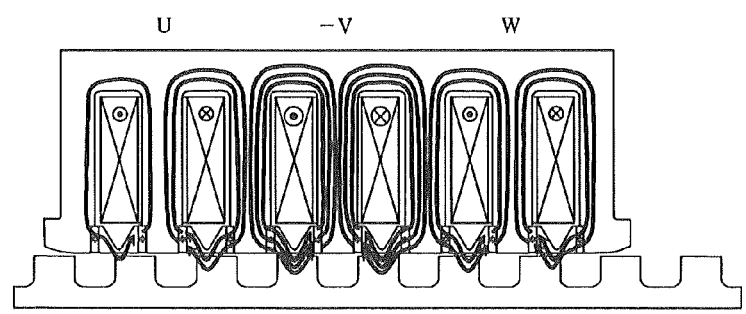
Figure 18D:
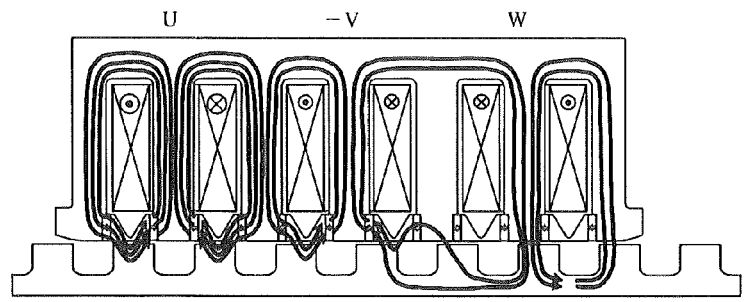
FIGS. 18D to 18F are explanatory diagrams of coil excitation states in the second embodiment.
Figure 18E:
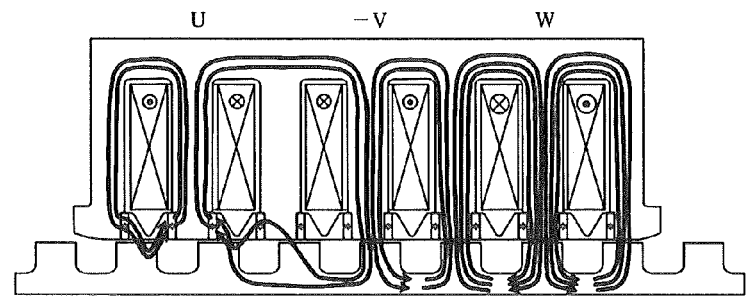
Figure 18F:
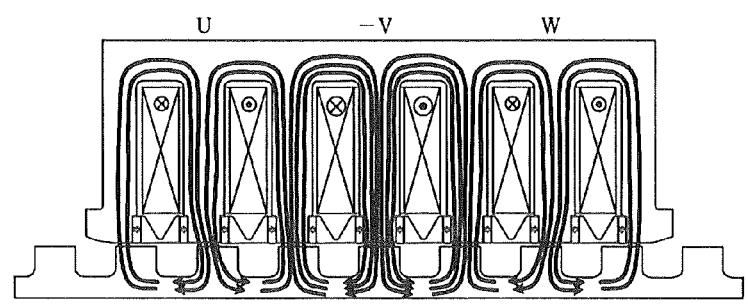

As illustrated in FIGS. 17A to 18F, coil excitation illustrated in FIGS. 17A to 18F represents almost one cycle of U phase, V phase, and W phase of an alternating current three-phase power supply. A current value in coil excitation illustrated in FIG. 17A is inversed in coil excitation illustrated in FIG. 18D.

The end portion 30a of each of the plurality of teeth 30 has a shape such that magnetoresistance of the tooth increases toward the root side. Thus, the magnetic flux of the coils 40 may flow in and out of the tooth-portion-60 side of the line of inductor teeth 2 (see FIG. 14). Furthermore, since opposite magnetic poles face each other for any adjacent two permanent magnets 50 one of which is arranged at a winding-use tooth 31 and the other one of which is arranged at a partition-use tooth 32, the short circuit magnetic flux between the permanent magnets 50 arranged between the plurality of teeth 30 may be used to increase a thrust (see FIG. 14).

Figure 19:
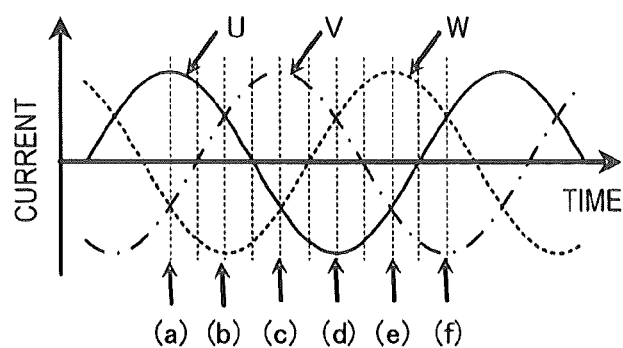
FIG. 19 is a current-time figure of coil excitation illustrated in FIGS. 17A to 18F.

FIG. 19 is a current-time figure of coil excitation illustrated in FIGS. 17A to 18F, the current-time figure being obtained by performing plotting. In FIG. 19, U phase is drawn with a solid line, V phase with an alternate-long-and-short-dash line, and W phase with a broken line.

Also in the second embodiment, similarly to as in the first embodiment, the relationship of Equation (1) is satisfied. In the case of the second embodiment, m=3, n=2, and τm=τs/2, thereby (τp/τm)=24/13≈1.85. Thus, the second embodiment satisfies the range of numerical values of Equation (1).

In the interior magnet linear induction motor 200 of the second embodiment, similarly to as in the first embodiment, the positions of the permanent magnets 50 are slightly shifted in phase from one another when seen from the tooth portions 60, which are inductor teeth. The cogging forces balance each other out and the cogging force of the entirety of the linear motor becomes small. Thus, according to the second embodiment, the interior magnet linear induction motor 200 may be provided that has small cogging force and a small change in thrust.

The interior magnet linear induction motor 200 of the second embodiment has operational effects that are basically similar to those of the first embodiment. In particular, in the interior magnet linear induction motor 200 of the second embodiment, two permanent magnets 50 are arranged at each of the end portions 30a of the teeth 30. In addition, opposite magnetic poles face each other for any adjacent two permanent magnets 50 one of which is arranged at a winding-use tooth 31 and the other one of which is arranged at a partition-use tooth 32, and the same magnetic poles face each other for adjacent permanent magnets 50 that are arranged at the same winding-use tooth 31 or partition-use tooth 32. Thus, even when a magnetic field is applied to permanent magnets in the forward or reverse direction by coil excitation, an effect may be produced in that demagnetization is suppressed as much as possible and the maximum thrust may be increased.

Third Embodiment

Figure 20:
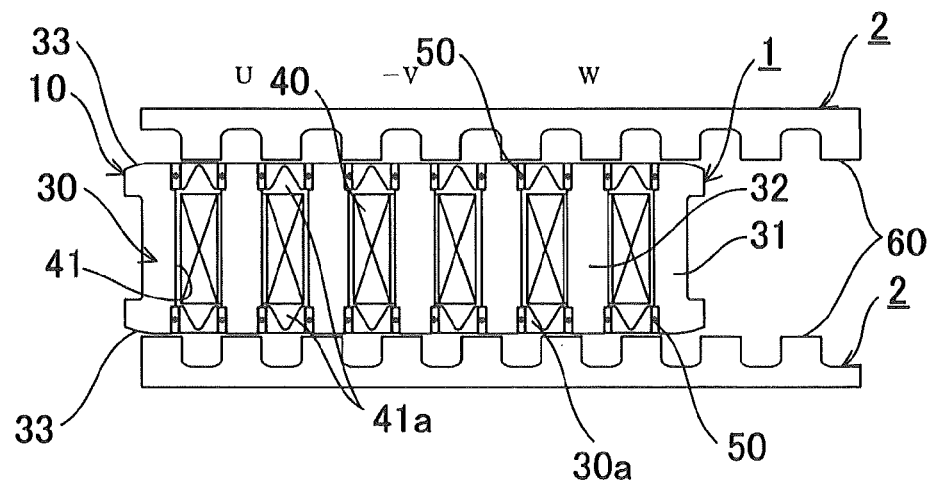
FIG. 20 is a schematic plan view of an interior magnet linear induction motor of a third embodiment.

Next, with reference to FIGS. 20 to 23, an interior magnet linear induction motor 300 of a third embodiment will be described. FIG. 20 is a schematic plan view of the interior magnet linear induction motor 300 of the third embodiment. Note that elements that are the same as those of the interior magnet linear induction motor 100 of the first embodiment are denoted by the same reference numerals and description thereof will be omitted.

As illustrated in FIG. 20, the interior magnet linear induction motor 300 of the third embodiment differs from the interior magnet linear induction motor 200 of the second embodiment in terms of the number of lines of inductor teeth 2 and the configuration of the armature core 10.

Lines of inductor teeth 2 are arranged at both sides (above and below) of the armature 1. The lines of inductor teeth 2 are provided such that the tooth portions 60 of the lines of inductor teeth 2 provided above and below the armature 1 are positioned in a staggered configuration in the linear stroke direction.

Since the lines of inductor teeth 2 are arranged at both sides (above and below) of the armature 1, both sides (above and below) of the armature core 10 correspond to the end portions 30a of the plurality of teeth 30. Thus, the armature core 10 according to the third embodiment does not include a yoke.

The end portions 30a of each of the plurality of teeth 30 have a shape such that magnetoresistance of the tooth increases toward the root side, that is, a shape whose width increases toward the line of inductor teeth 2.

Both sides (above and below) of the slots 41 of the armature core 10 are formed in a V shape in vertical cross section. In FIG. 20, the coils 40 are arranged only in central portions of the slots 41; however, the arrangement positions of the coils 40 are not limited to this. The coils 40 may be arranged also in V-shaped portions 41a.

Permanent magnets 50 are arranged at both ends (top and bottom portions) of each of the plurality of teeth 30. Specifically, permanent magnets 50 are arranged at both sides of the tooth 30 in a direction in which the V-shaped portions 41a move. Permanent magnets 50 are arranged at a constant pitch over the plurality of teeth 30 on both sides, in the linear stroke direction.

Any adjacent two permanent magnets 50 one of which is arranged at a winding-use tooth 31 and the other one of which is arranged at a partition-use tooth 32 are magnetized such that opposite magnetic poles face each other. In addition, adjacent permanent magnets 50 that are arranged at the same winding-use tooth 31 or partition-use tooth 32 are magnetized such that the same magnetic poles face each other.

Next, with reference to FIGS. 21A to 23, the coil excitation states of the interior magnet linear induction motor 300 of the third embodiment will be described. FIGS. 21A to 22F are explanatory diagrams of simulation of coil excitation states. Note that, in FIGS. 21A to 22F, the reference numerals of constituent elements are omitted for better visibility of the coil excitation states.

Figure 21A:
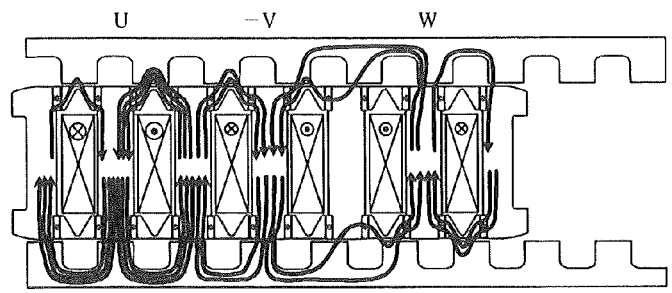
FIGS. 21A to 21C are explanatory diagrams of coil excitation states in the third embodiment.
Figure 21B:
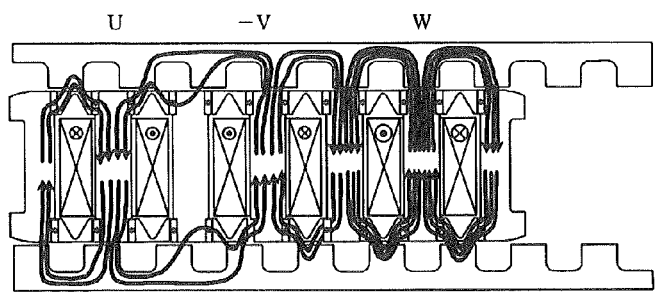
Figure 21C:
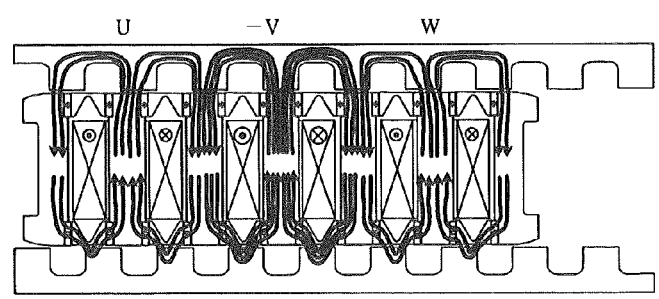
Figure 22D:
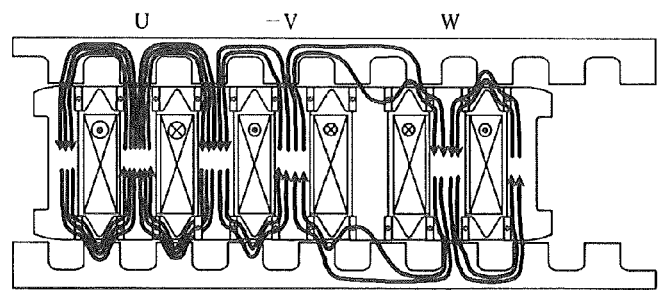
FIGS. 22D to 22F are explanatory diagrams of coil excitation states in the third embodiment.
Figure 22E:
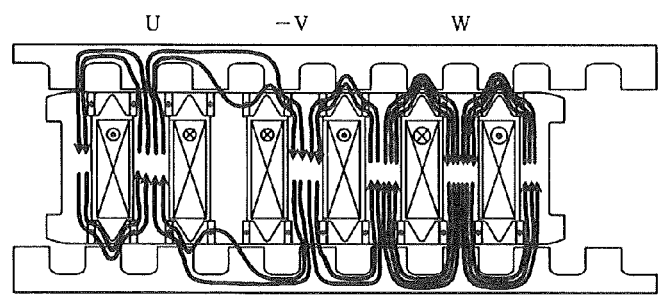
Figure 22F:
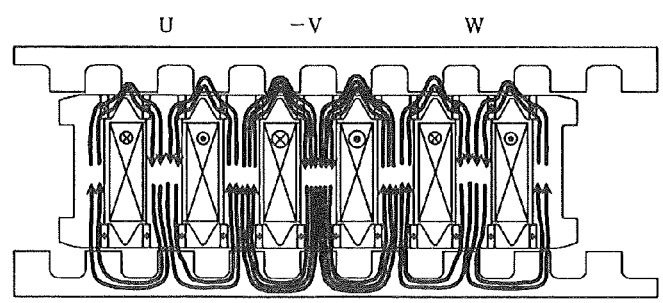

As illustrated in FIGS. 21A to 22F, coil excitation illustrated in FIGS. 21A to 22F represents almost one cycle of U phase, V phase, and W phase of an alternating current three-phase power supply. A current value in coil excitation illustrated in FIG. 21A is inversed in coil excitation illustrated in FIG. 22D.

The end portions 30a of each of the plurality of teeth 30 have a shape such that magnetoresistance of the tooth increases toward the root side. Thus, the magnetic flux of the coils 40 may flow in and out of the tooth-portion-60 side of the lines of inductor teeth 2 (see FIG. 20). Furthermore, since opposite magnetic poles face each other for any adjacent two permanent magnets 50 one of which is arranged at a winding-use tooth 31 and the other one of which is arranged at a partition-use tooth 32, the short circuit magnetic flux between the permanent magnets 50 arranged between the plurality of teeth 30 may be used to increase a thrust (see FIG. 20).

Figure 23:
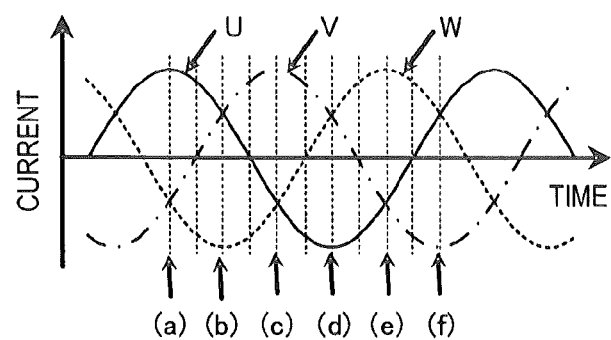
FIG. 23 is a current-time figure of coil excitation illustrated in FIGS. 21A to 22F.

FIG. 23 is a current-time figure of coil excitation illustrated in FIGS. 21A to 22F, the current-time figure being obtained by performing plotting. In FIG. 23, U phase is drawn with a solid line, V phase with an alternate-long-and-short-dash line, and W phase with a broken line.

Also in the third embodiment, similarly to as in the first and second embodiments, the relationship of Equation (1) is satisfied. In the case of the third embodiment, m=3, n=2, and τm=τs/2, thereby (τp/τm)=24/13≈1.85. Thus, the third embodiment satisfies the range of numerical values of Equation (1).

In the interior magnet linear induction motor 300 of the third embodiment, similarly to as in the first and second embodiments, the positions of the permanent magnets 50 are slightly shifted in phase from one another when seen from the tooth portions 60, which are inductor teeth. The cogging forces balance each other out and the cogging force of the entirety of the linear motor becomes small. Thus, according to the third embodiment, the interior magnet linear induction motor 300 may be provided that has small cogging force and a small change in thrust.

The interior magnet linear induction motor 300 of the third embodiment has operational effects that are basically similar to those of the second embodiment. In particular, in the interior magnet linear induction motor 300 of the third embodiment, the lines of inductor teeth 2 are arranged at both sides of the armature 1 and the permanent magnets 50 are arranged at the end portions 30a of the plurality or teeth 30 on both sides of the armature core 10. Thus, the interior magnet linear induction motor 300 of the third embodiment has a characteristic effect in that a greater linear driving force may be obtained.

Fourth Embodiment

Figure 24:
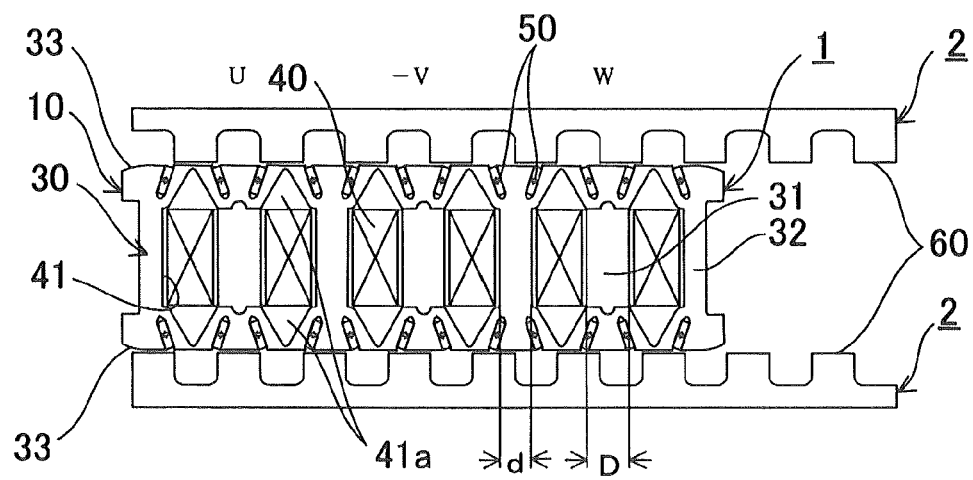
FIG. 24 is a schematic plan view of an interior magnet linear induction motor of a fourth embodiment.
Figure 25:
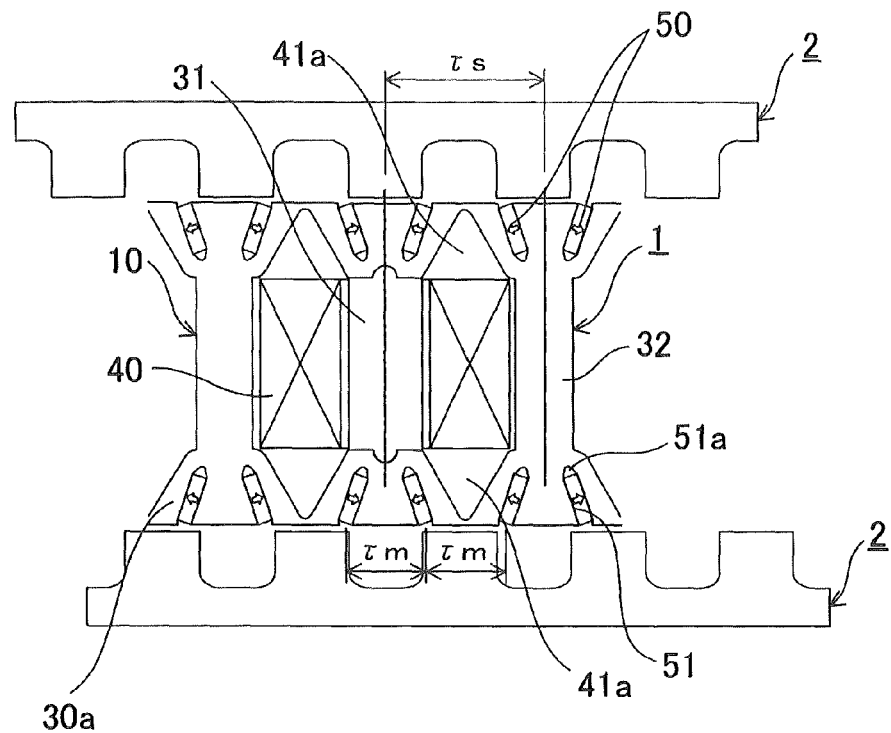
FIG. 25 is an enlarged view of a main part of FIG. 24.
Figures 26A, 26B:
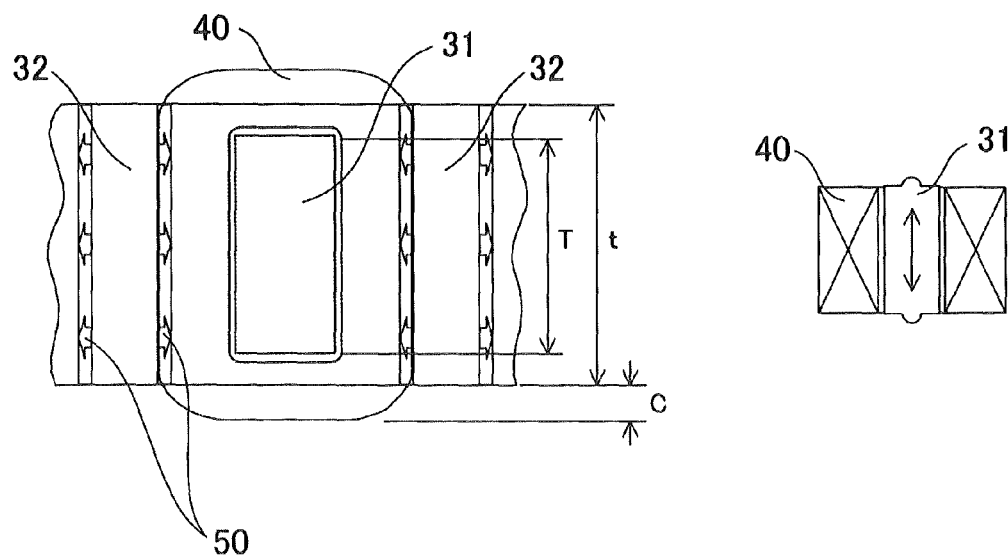
FIGS. 26A and 26B are a schematic plan view and a schematic side view of a modified example in which winding-use portions of winding-use teeth are formed as portions included in a divided-type configuration.

Next, with reference to FIGS. 24 to 26B, an interior magnet linear induction motor 400 of a fourth embodiment will be described. FIG. 24 is a schematic plan view of the interior magnet linear induction motor 400 of the fourth embodiment. FIG. 25 is an enlarged view of a main part of FIG. 24. FIGS. 26A and 26B are a schematic plan view and a schematic side view of a modified example in which winding-use portions of the winding-use teeth 31 are formed as portions included in a divided-type configuration. Note that elements that are the same as those of the interior magnet linear induction motor 100 of the first embodiment are denoted by the same reference numerals and description thereof will be omitted.

As illustrated in FIGS. 24 and 25, the interior magnet linear induction motor 400 of the fourth embodiment differs from the interior magnet linear induction motor 300 of the third embodiment in terms of the arrangement of the permanent magnets 50 and the width of the winding-use teeth 31. Similarly to as in the third embodiment, the lines of inductor teeth 2 are arranged at both sides of the armature 1 and the permanent magnets 50 are arranged at the end portions 30a of the plurality of teeth 30 on both sides of the armature core 10.

That is, in the interior magnet linear induction motor 400 of the fourth embodiment, the permanent magnets 50 are arranged such that the permanent magnets 50 are tilted with respect to the end portions 30a of both sides of the plurality of teeth 30 and the width of the winding-use teeth 31 is set to be wide.

The end portions 30a of each of the plurality of teeth 30 have a shape such that magnetoresistance of the tooth increases toward the root side, that is, a shape whose width increases toward the line of inductor teeth 2.

Both sides (above and below) of the slots 41 of the armature core 10 are formed in a V shape in vertical cross section. Two permanent magnets 50 are arranged at each end portion 30a of each of the teeth 30. The permanent magnets 50 are arranged such that each of the permanent magnets 50 is tilted so as to match a tilt of the V-shaped portion 41a of a corresponding slot 41. In the inner side of the armature 1, the permanent magnet 50 is tilted so as to be oriented toward the center of the tooth 30.

Adjacent permanent magnets 50 with a slot 41 therebetween are arranged so as to form substantially a V shape. In contrast, adjacent permanent magnets 50 with no slot 41 therebetween are arranged so as to form substantially an inverted V shape.

Opposite magnetic poles face each other for any adjacent two permanent magnets 50 one of which is arranged at a winding-use tooth 31 and the other one of which is arranged at a partition-use tooth 32, and the same magnetic poles face each other for adjacent permanent magnets 50 that are arranged at the same winding-use tooth 31 or partition-use tooth 32.

When the number of the permanent magnets 50 is greater than or equal to 2 for each end portion 30a of each of the plurality of teeth 30, the permanent magnets 50 may have a configuration in which the position of each of the permanent magnets 50 is tilted so as to be oriented toward the center of a corresponding tooth 30 in a sequential manner, in the inner side of the armature 1. By arranging and tilting each of the permanent magnets 50 so as to be oriented toward the center of a corresponding tooth 30 in a sequential manner, a magnetic field caused by coil excitation may be uniformly applied to each of the permanent magnets 50, thrust ripples may be made to be small, and the maximum thrust may be increased.

Spaces 51a may be present at the back (the inner-side portion) of the magnet housing portions 51 used to house the permanent magnets 50. By forming the spaces 51a at the back of the magnet housing portions 51, internal short of magnetic flux of the permanent magnets 50 may be suppressed and a thrust is increased by increasing the amount of magnetic flux generated on a gap surface.

In addition, the width D of the winding-use teeth 31 of the coils 40 may be set to be wider than the width d of the partition-use teeth 32 of the slots 41. By setting the width D of the winding-use teeth 31 to be wider than the width d of the partition-use teeth 32, the magnetoresistance of the winding-use teeth 31 may be reduced and a thrust may be increased.

Furthermore, as illustrated in FIG. 26A, the width of the winding-use teeth 31 in a direction perpendicular to the stroke direction may be set to be narrower than the width of the partition-use teeth 32 in the direction perpendicular to the stroke direction. In the fourth embodiment, since the armature core 10 is formed of a core stack, a stacking thickness T of the winding-use teeth 31 may be set to be smaller than a stacking thickness t of the partition-use teeth 32 (see FIG. 7). By setting the stacking thickness T of the winding-use teeth 31 to be smaller than the stacking thickness t of the partition-use teeth 32, a degree of protrusion C of a coil end 40a may be suppressed without increasing the magnetoresistance of the winding-use teeth 31 and space saving and thrust increase may be realized.

As illustrated in FIG. 26B, in the case where the winding-use portions 31a are formed as separate cores, as a component material of the winding-use portions 31a, a directional electrical steel sheet may be used so as to match a direction of the flow of magnetic flux. By forming the winding-use portions 31a out of a directional electrical steel sheet, the magnetoresistance of the winding-use portions 31a may be reduced, a thrust and a coil area are increased, and a higher efficiency may be realized. In addition, by forming the winding-use portions 31a as separate cores, the coils 40 may be formed around the winding-use portions 31a in advance.

The interior magnet linear induction motor 400 of the fourth embodiment has operational effects that are basically similar to those of the third embodiment. In particular, in the interior magnet linear induction motor 400 of the fourth embodiment, the permanent magnets 50 are arranged such that each of the permanent magnets 50 is tilted so as to be oriented toward the center of a corresponding tooth 30 in a sequential manner. As a result, a magnetic field caused by coil excitation may be uniformly applied to each of the permanent magnets 50, thrust ripples may be made to be small, and the maximum thrust may be increased. In addition, by forming the spaces 51a at the back of the magnet housing portions 51, a characteristic effect may be produced in that internal short of magnetic flux of the permanent magnets 50 may be suppressed and a thrust is increased by increasing the amount of magnetic flux generated on a gap surface.

Fifth Embodiment

Figure 27:
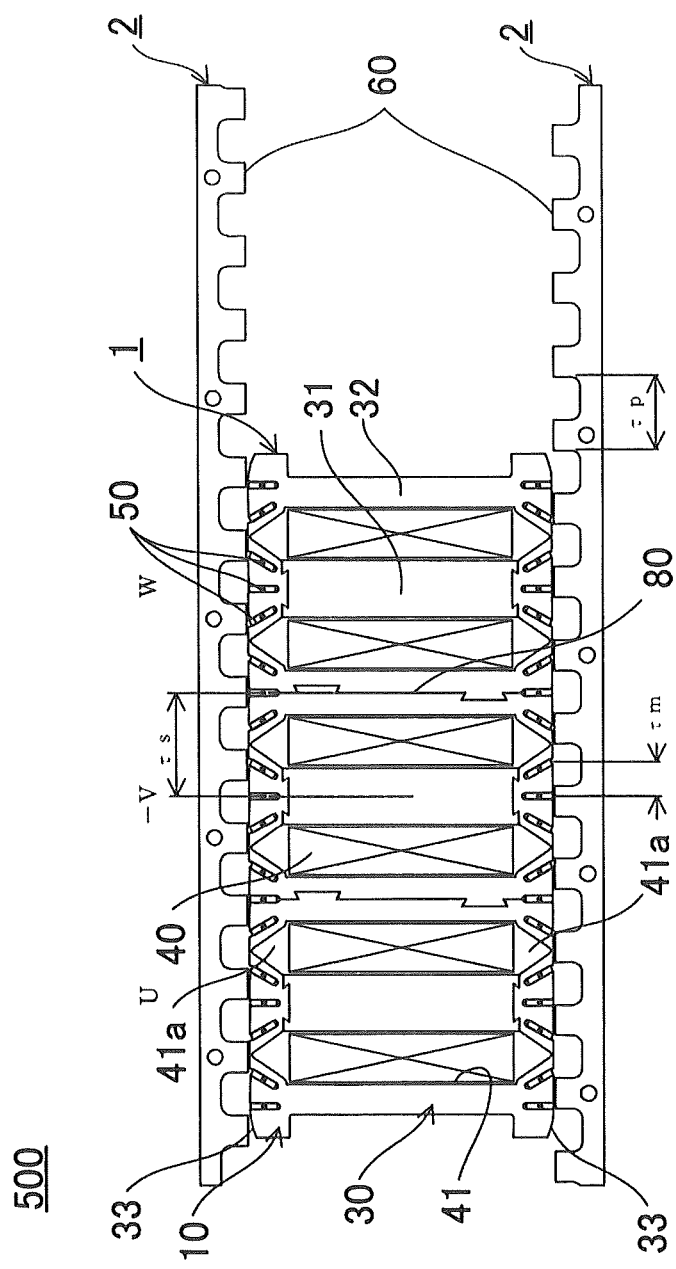
FIG. 27 is a schematic plan view of an interior magnet linear induction motor of a fifth embodiment.

Next, with reference to FIG. 27, an interior magnet linear induction motor 500 of a fifth embodiment will be described. FIG. 27 is a schematic plan view of the interior magnet linear induction motor 500 of the fifth embodiment. Note that elements that are the same as those of the interior magnet linear induction motor 100 of the first embodiment are denoted by the same reference numerals and description thereof will be omitted.

As illustrated in FIG. 27, the interior magnet linear induction motor 500 of the fifth embodiment differs from the interior magnet linear induction motor 400 of the fourth embodiment in terms of the number of the permanent magnets 50. Similarly to as in the third and fourth embodiments, the lines of inductor teeth 2 are arranged at both sides of the armature 1 and the permanent magnets 50 are arranged at the end portions 30a of the plurality of teeth 30 on both sides of the armature core 10.

That is, in the interior magnet linear induction motor 500 of the fifth embodiment, except for the teeth 30 at both ends in the linear stroke direction, three permanent magnets 50 are arranged at each end portion 30a of each of the plurality of teeth 30.

Adjacent permanent magnets 50 with a slot 41 therebetween are arranged so as to form substantially a V shape. In contrast, adjacent permanent magnets 50 with no slots 41 therebetween are arranged so as to form substantially a shape obtained by arranging a vertical line between two lines of an inverted V shape.

Any adjacent two permanent magnets 50 one of which is arranged at a winding-use tooth 31 and the other one of which is arranged at a partition-use tooth 32 are magnetized such that opposite magnetic poles face each other. In addition, adjacent permanent magnets 50 that are arranged at the same winding-use tooth 31 or partition-use tooth 32 are magnetized such that the same magnetic poles face each other.

By arranging three permanent magnets 50 at each end portion 30a of each of the plurality of teeth 30, a magnetic field caused by coil excitation may be uniformly applied to each of the permanent magnets 50, thrust ripples may be made to be small, and the maximum thrust may be increased.

In addition, division surfaces 80 of the armature core 10 may be formed each of which is almost at the center of a corresponding one of the partition-use teeth 32, around which the coils 40 are not formed. The division surfaces 80 of the partition-use teeth 32 are formed to have an engagement configuration; however, the engagement configuration is not limited to the one illustrated in FIG. 27. By forming the division surfaces 80 almost at the centers of the partition-use teeth 32, linear motors may be manufactured that have different capacities and that are easily assembled without increasing the number of electrical-steel trimming dies.

Also in the fifth embodiment, similarly to as in the first to third embodiments, the relationship of Equation (1) is satisfied. In the case of the fifth embodiment, m=3, n=3, and $\tau m=\tau s/3$, thereby $(\tau p/\tau m)=(\tau p/\tau m)=36/17\approx2.12$. Thus, the fifth embodiment satisfies the range of numerical values of Equation (1).

In the interior magnet linear induction motor 500 of the fifth embodiment, similarly to as in the first to fourth embodiments, the positions of the permanent magnets 50 are slightly shifted in phase from one another when seen from the tooth portions 60, which are inductor teeth. The cogging forces balance each other out and the cogging force of the entirety of the linear motor becomes small. Thus, according to the fifth embodiment, the interior magnet linear induction motor 500 may be provided that has small cogging force and a small change in thrust.

The interior magnet linear induction motor 500 of the fifth embodiment has operational effects that are basically similar to those of the fourth embodiment. In particular, in the interior magnet linear induction motor 500 of the fifth embodiment, a characteristic effect may be produced in that a magnetic field caused by coil excitation may be uniformly applied to each of the permanent magnets 50 by arranging three permanent magnets 50 at each end portion 30a of each of the plurality of teeth 3, thrust ripples may be made to be small, and the maximum thrust may be increased.

Sixth Embodiment

Next, with reference to FIGS. 28A to 29C, an interior magnet linear induction motor of a sixth embodiment will be described. FIGS. 28A to 29C are schematic explanatory diagrams of a divided-type configuration of the armature core 10 in the sixth embodiment. Note that elements that are the same as those of the interior magnet linear induction motor 100 of the first embodiment are denoted by the same reference numerals and description thereof will be omitted.

Figure 28A:
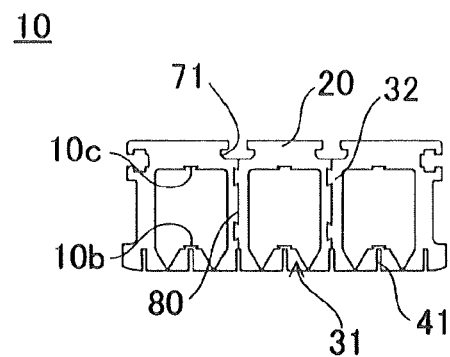
FIGS. 28A to 28C are schematic explanatory diagrams of a divided-type configuration of an armature core in a sixth embodiment.
Figure 28B:
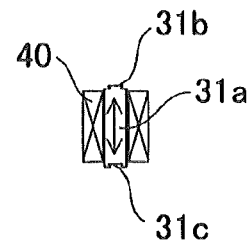
Figure 28C:
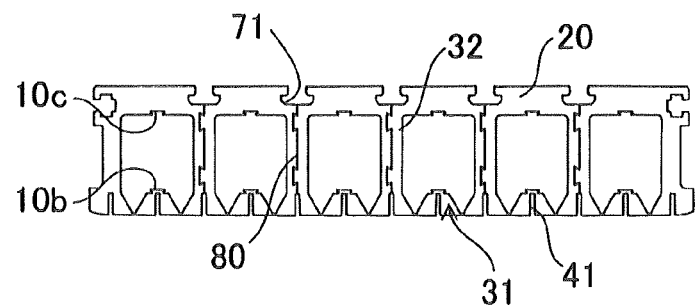

The armature core 10 of FIGS. 28A to 28C is obtained by changing the configuration of the armature core 10 of the modified example of the first embodiment in FIG. 10 to a divided-type configuration.

As illustrated in FIGS. 28A and 28C, the division surfaces 80 of the armature core 10 may be formed each of which is almost at the center of a corresponding one of the partition-use teeth 32, around which the coils 40 are not formed. The division surfaces 80 of the partition-use teeth 32 are formed to have an engagement configuration; however, the engagement configuration is not limited to the one illustrated in FIGS. 28A to 28C. By forming the division surfaces 80 almost at the centers of the partition-use teeth 32, linear motors may be manufactured that have different capacities and that are easily assembled without increasing the number of electrical-steel trimming dies.

In addition, the winding-use portions 31a of the winding-use teeth 31, around which the coils 40 are formed, may be formed as separate cores. A winding-use portion 31a of FIG. 28B is formed to have an engagement configuration such that one end of the winding-use portion 31a is a convex portion 31b and the other end is a concave portion 31c. At connection portions of the main body of the armature core 10 to which such winding-use portions 31a are connected, a concave portion 10c and a convex portion 10b are formed that are capable of engaging with the convex portion 31b and the concave portion 31c of the winding-use portion 31a.

Figure 29A:
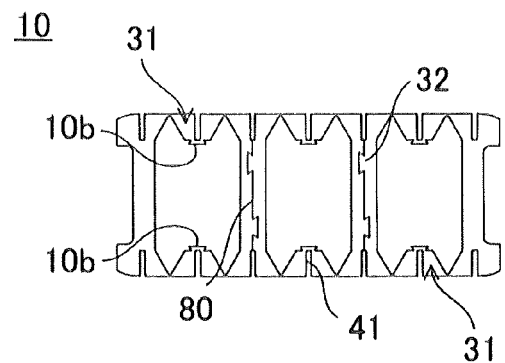
FIGS. 29A to 29C are schematic explanatory diagrams of a divided-type configuration of an armature core in the sixth embodiment.
Figure 29B:
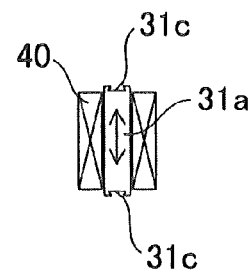
Figure 29C:
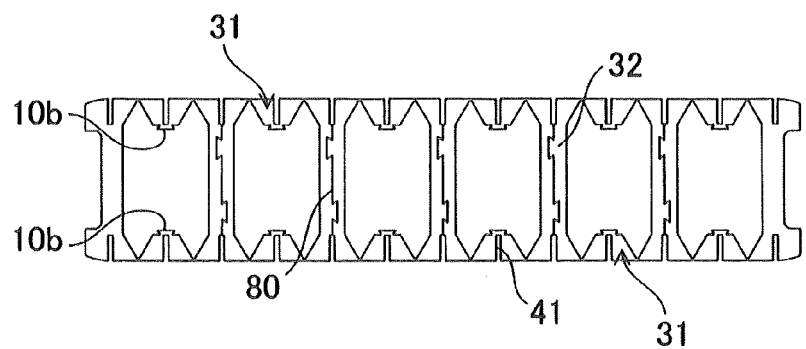

The armature core 10 of FIGS. 29A to 29C has a line of inductor teeth on both sides of an armature, and has a divided-type configuration in the case of one permanent magnet.

As illustrated in FIGS. 29A and 29C, the division surfaces 80 of the armature core 10 may be formed each of which is almost at the center of a corresponding one of the partition-use teeth 32, around which the coils 40 are not formed. The division surfaces 80 of the partition-use teeth 32 are formed to have an engagement configuration; however, the engagement configuration is not limited to the one illustrated in FIGS. 29A to 29C. By forming the division surfaces 80 almost at the centers of the partition-use teeth 32, linear motors may be manufactured that have different capacities and that are easily assembled without increasing the number of electrical-steel trimming dies.

In addition, the winding-use portions 31a of the winding-use teeth 31, around which the coils 40 are formed, may be formed as separate cores. A winding-use portion 31a of FIG. 29B is formed to have an engagement configuration such that both ends of the winding-use portion 31a are concave portions 32b. At connection portions of the main body of the armature core 10 to which such winding-use portions 31a are connected, a convex portion 10b is formed that is capable of engaging with either of the concave portions 32b of both ends of the winding-use portion 31a.

In the case where the winding-use portions 31a are formed as separate cores, as a component material of the winding-use portions 31a, a directional electrical steel sheet may be used so as to match a direction of the flow of magnetic flux. By forming the winding-use portions 31a out of a directional electrical steel sheet, the magnetoresistance of the winding-use portions 31a may be reduced, a thrust and a coil area are increased, and a higher efficiency may be realized. In addition, by forming the winding-use portions 31a as separate cores, the coils 40 may be formed around the winding-use portions 31a in advance.

The armature core 10 with a divided-type configuration in the sixth embodiment has operational effects that are basically similar to those of the separate cores 10 in the first to fifth embodiments. In particular, the armature core 10 with the divided-type configuration in the sixth embodiment has a characteristic effect in that, by forming the division surfaces 80 almost at the centers of the partition-use teeth 32, around which the coils 40 are not formed, linear motors may be manufactured that have different capacities and that are easily assembled without increasing the number of electrical-steel trimming dies.

Preferred embodiments of the present invention have been described above; however, these embodiments are mere examples for describing the present invention. Therefore, the scope of the present invention is not limited to these embodiments. Various modifications are permissible within the scope and spirit of the present invention.

What is claimed is:

1. An interior magnet linear induction motor comprising:
a linear armature that includes coils arranged between a plurality of teeth; and
a linear line of inductor teeth that is arranged so as to face the armature and includes a plurality of tooth portions arranged at a constant pitch in a linear stroke direction, wherein
an end portion of each of the plurality of teeth of the armature has a shape such that magnetoresistance of the tooth increases toward a root side of the teeth of the armature, and
a plurality of permanent magnets in the plurality of teeth, the plurality of permanent magnets including at least one permanent magnet arranged at a top and bottom of an end portion of each of the plurality of teeth in a direction perpendicular to a longitudinal direction of the linear armature, and adjacent permanent magnets that are arranged at different teeth are magnetized such that opposite magnetic poles face each other;
wherein all of the permanent magnets are arranged at a constant pitch over the plurality of teeth in the linear stroke direction;
wherein two of the permanent magnets are arranged at an end portion on opposite sides of each of the plurality of teeth, such that the same magnetic poles of the two of the permanent magnets face each other;
wherein a maximum of two of the permanent magnets are between adjacent teeth.

2. The interior magnet linear induction motor as claimed in claim 1, wherein in the case where two or more permanent magnets are arranged at an end portion of each of the plurality of teeth, adjacent permanent magnets that are arranged at the same tooth are magnetized such that the same magnetic poles face each other.

3. The interior magnet linear induction motor as claimed in claim 2, wherein in the case where two or more permanent magnets are arranged at an end portion of each of the plurality of teeth, the permanent magnets are arranged such that the permanent magnets are tilted so as to match a tilt of a shape of the end portion of the tooth and to be oriented toward the center of the tooth in the inner side of a core of the armature.

4. The interior magnet linear induction motor as claimed in claim 1, wherein the permanent magnet extends from the end portion of the tooth toward an inner side of a core of the armature, and an end of the permanent magnet is located between corresponding coils.

5. The interior magnet linear induction motor as claimed in claim 1, wherein a core of the armature has a divided-type configuration in which a plurality of separate cores are joined together.

6. The interior magnet linear induction motor as claimed in claim 5, wherein in the core of the armature, at least, winding-use portions of teeth around which the coils are to be formed are formed as portions included in the divided-type configuration.

7. The interior magnet linear induction motor as claimed in claim 1, wherein a coil is formed around every other tooth among the plurality of teeth.

8. The interior magnet linear induction motor as claimed in claim 1, wherein a coil is formed around each of the plurality of teeth.

9. The interior magnet linear induction motor as claimed in claim 1, wherein a width of teeth around which the coils are to be formed is set to be wider than that of teeth around which the coils are not to be formed.

10. The interior magnet linear induction motor as claimed in claim 1, wherein a width of teeth around which the coils are to be formed in a lateral side-to-side direction perpendicular to the linear stroke direction is set to be narrower than that of teeth around which the coils are not to be formed in the direction perpendicular to the linear stroke direction.

11. The interior magnet linear induction motor as claimed in claim 1, wherein both sides of the armature are provided with a line of inductor teeth, and
the end portions of the plurality of teeth are arranged at both sides of the armature so as to face lines of inductor teeth and the permanent magnets are arranged at the end portions of the plurality of teeth at both sides of the armature.

12. An interior magnet linear induction motor, comprising:
a linear armature that includes coils arranged between a plurality of teeth; and
a linear line of inductor teeth that is arranged so as to face the armature and includes a plurality of tooth portions arranged at a constant pitch in a linear stroke direction, wherein
an end portion of each of the plurality of teeth of the armature has a shape such that magnetoresistance of the tooth increases toward a root side of the teeth of the armature, and
a plurality of permanent magnets in the plurality of teeth, the plurality of permanent magnets including at least one permanent magnet arranged at an end portion of each of the plurality of teeth, and adjacent permanent magnets that are arranged at different teeth are magnetized such that opposite magnetic poles face each other;
wherein in the case where the number of phases is denoted by m, where m is an integer greater than or equal to 2, a pitch at which the plurality of teeth are arranged is denoted by $\tau s$, the number of permanent magnets at the end portion of each of the plurality of teeth is denoted by n, where n is an integer greater than or equal to 1, a pitch at which magnet housing portions are arranged is denoted by $\tau m$, and a pitch at which the tooth portions, which are inductor teeth, are arranged is denoted by $\tau p$, a relationship of an equation $\tau m = \tau s/n$, where $1.5 \leq (\tau p/\tau m) < 2$ or $2 < (\tau p/\tau m) \leq 2.5$, is satisfied;
wherein all of the permanent magnets are arranged at a constant pitch over the plurality of teeth in the linear stroke direction;
wherein two of the permanent magnets are arranged at an end portion on opposite sides of each of the plurality of teeth, such that the same magnetic poles of the two of the permanent magnets face each other;
wherein a maximum of two of the permanent magnets are between adjacent teeth.

* * * * *